United States Patent

[11] 3,591,314

[72] Inventor Ronald H. Day
     Mill Valley, Calif.
[21] Appl. No. 803,178
[22] Filed Feb. 28, 1969
[45] Patented July 6, 1971
[73] Assignees Industrial Covers Inc.
     San Francisco, Calif. ;
     Sargent Industries, Inc.
     Los Angeles, Calif.

[54] ASPIRATOR APPARATUS FOR BAG-INFLATION SYSTEM
     15 Claims, 4 Drawing Figs.
[52] U.S. Cl. .................................................... 417/179,
     417/190
[51] Int. Cl. .................................................... F04f 5/16,
     F04f 5/48
[50] Field of Search ............................................ 230/95,
     103, 110, 111, 112; 103/272, 274, 275, 263;
     417/179, 190, 191

[56]  References Cited
      UNITED STATES PATENTS
2,859,908  11/1958  Neigel ........................  230/95
2,975,958  3/1961   Kane ..........................  230/95
3,204,862  9/1965   Hadeler ......................  230/95
3,460,746  8/1969   Green et al. .................  230/95 X Primary Examiner—Robert M. Wlaker
Attorney—Smyth, Roston & Pavitt ABSTRACT: An improved aspirator device for bag-inflation systems and the like which is rotationally symmetrical about the axis of the device and includes an annular atmospheric flow path concentric with one or more rings of aspirating jets to provide a high-efficiency aspirating function. The aspirator includes a single operation closure component which acts to open the atmospheric flow path upon actuation of the device and close the atmospheric flow path when a predetermined pressure has been built up within the inflated device.

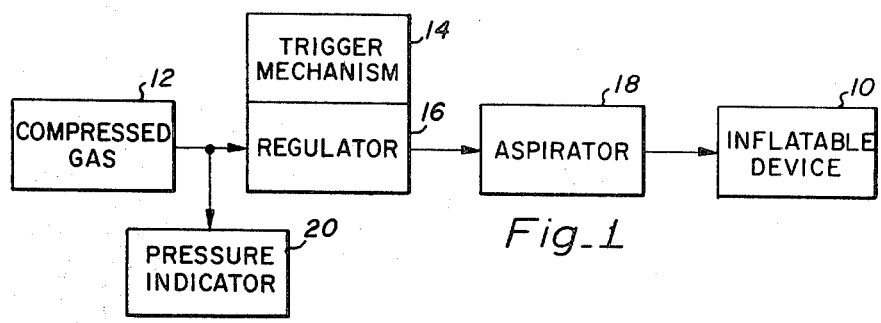
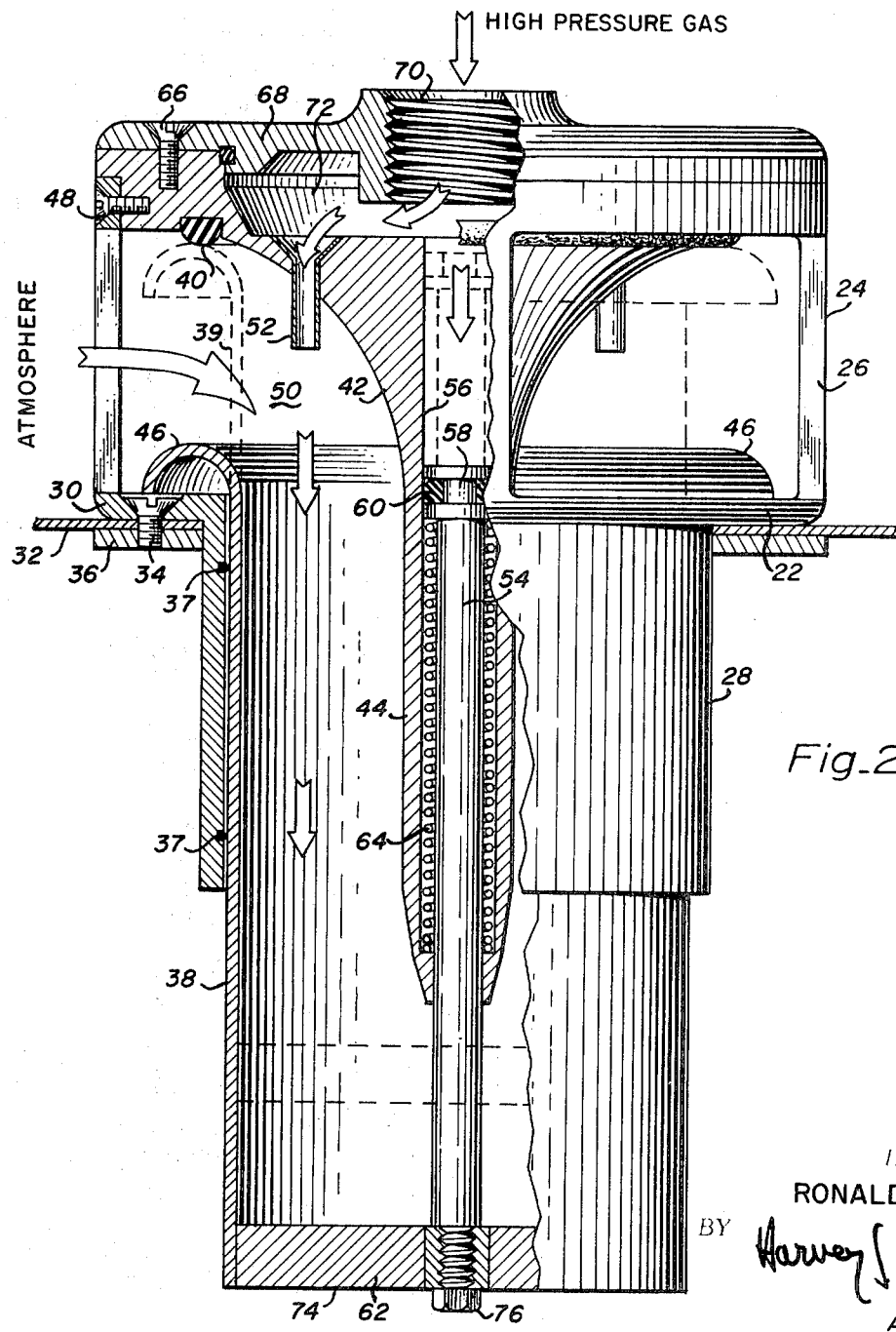

INVENTOR.
RONALD H. DAY
ATTORNEY

ASPIRATOR APPARATUS FOR BAG-INFLATION SYSTEM

BACKGROUND OF THE INVENTION

The present invention relates generally to aspirator devices and, more particularly, to a novel aspirator structure for use in compressed-gas-bag-inflation systems.

Aspirator devices have long been used in bag-inflation systems to aspirate into low-pressure inflation bags such as life rafts, aircraft escape chutes, etc., a volume of ambient compressed gas used to cause the aspirating action. Examples of aspirating devices of this type known in the prior art are disclosed in U.S. Pat. No. 3,042,290 to Froebel, U.S. Pat. No. 3,056,540 to Marsh et al., and U.S. Pat. No. 3,158,314.

Since bag-inflation systems find widespread use in rescue applications, it is of utmost importance that the reliability of each component of the system be quite high so that the reliability of the system as a whole is high. In such applications the mechanical components which perform the inflation operation are typically inactive for long periods of time and are in many instances subjected to hostile environments such as corrosive atmosphere, temperature extremes and abusive handling. It is therefore desirable that each mechanical component be as rugged and simple in construction as is possible while still having optimum performance characteristics.

One of the principal disadvantages of the prior art devices is the tortuous path which the aspirated air must follow between the point at which it enters the aspirating structure and the point at which it is exhausted into the inflatable device. This is an important factor in the design of any aspirator since the tortuosity of the flow math materially affects the aspirating efficiency of the device.

Another disadvantage apparent among prior art aspirators which also affects the efficiency of the device is the fact that the high-pressure jet stream for effecting the aspirating function is not oriented to flow directly into the inflatable device but must also follow a tortuous path before reaching the aspirator effluent ports.

Still another disadvantage of certain prior art structures is that the speed of aspiration is necessarily limited because of the small number of high-pressure jets which can be utilized in the aspirating throat of the device due to the available intake area.

Still another disadvantage of certain prior art aspirators is that they require a large number of component parts which in addition to reducing the reliability of the device also tend to increase the cost of manufacture.

OBJECTS OF THE INVENTION

It is therefore a principal object of the present invention to provide a novel aspirating device which is simple in mechanical structure and has a high aspirating efficiency.

Another object of the present invention is to provide a highly efficient aspirating device having a minimum number of moving components.

Still another object of the present invention is to provide an aspirating apparatus for bag inflation systems wherein the flow path of the aspirated gas is unimpeded by flow directional changes or flapper valves within the aspirating flow path.

Still another object of the present invention is to provide an aspirating device having a substantially increased rate of aspiration as compared to prior art structures.

SUMMARY OF THE INVENTION

In accordance with the present invention, a novel aspirator structure is provided which is rotationally symmetric about an axis normal to its effluent orifice and includes a cylindrical venturi path which is directly aligned with the aspirating jets. The exterior wall of the aspirating chamber is a displaceable cylinder, one end of which serves as a gate for the aspirated medium. This cylinder is normally biased into a closed position by a spring means but is actuated into an open position in response to gas pressure applied to the end of an actuating plunger coupled thereto. The spring means causes the cylinder to be returned to its closed position when the difference in pressure between the gas pressure applied to the top of the actuating piston is insufficient to overcome the force of the return spring.

An important advantage of the present invention is that it involves a minimum of operative component parts.

Another advantage of the present invention is that the momentum of the aspirated gases is directed straight through the exit port of the aspirator apparatus.

Still another advantage of the present invention is that it includes means for closing the atmospheric entrance at a predetermined gas pressure so that the remaining high-pressure gas is utilized to inflate the device to a pressure slightly in excess of atmospheric pressure.

Still other advantages of the present invention will become apparent to those of skill in the art after having read the following disclosure of a preferred embodiment which is illustrated in the several figures of the drawing.

IN THE DRAWING

FIG. 1 is a block diagram of an inflation system including an aspirator in accordance with the present invention.

FIG. 2 is a partially broken-away illustration of an aspirator device in accordance with the present invention.

DESCRIPTION OF THE PREFERRED EMBODIMENTS

Figure 3:
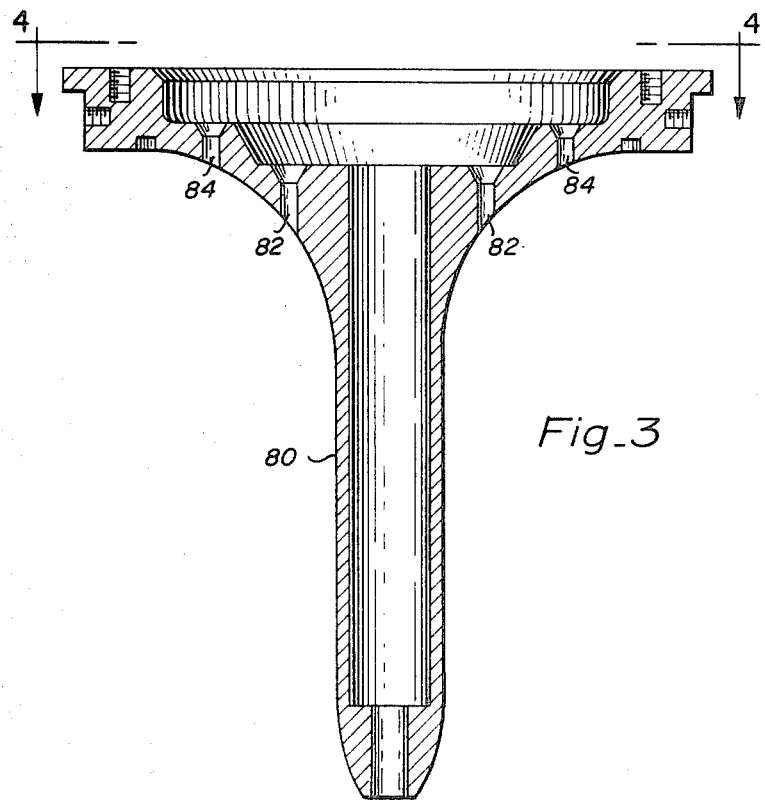
FIG. 3 is a cross section of an alternate embodiment of a jet-supporting and flow-directing member for use in accordance with the present invention.

Referring now to FIG. 1 of the drawing, there is shown a block diagram of an inflation system of the type utilized to inflate life rafts, aircraft escape chutes and the like. In these types of systems, the filling port of the inflatable device 10 is connected to a source of compressed gas 12, a gas regulator mechanism 16 having a suitable trigger mechanism 14, and an aspirating device 18. A pressure indicator 20 is also provided for determining whether the source 12 contains a quantity of gas capable of inflating the device 10 in the manner intended.

A preferred form of a pressure indicator apparatus is disclosed in the copending U.S. Pat. application Ser. No. 800,062 filed Feb. 18, 1969 now abandoned. A trigger mechanism is disclosed in the U.S. Pat. application Ser. No. 845,742 filed July 29, 1969 and a regulator device is disclosed in the copending U.S. Pat. application Ser. No. 845,742 filed July 29, 1969, now abandoned. All of the above applications are assigned to the assignee of the present invention.

In inflation systems of this type, the inflatable device 10 is typically deflated and packaged in a suitable stowage configuration with the pressurizing system attached to the filling aperture thereof. The pressure source 12 is generally a high-pressure container filled with a gas which is compressed to about 3,000 p.s.i. and a triggerable flow-regulating means 16 including a trigger mechanism 14 is usually provided to enable the pressurized gas container to be opened as rapidly as possible to inflate the device 10. The regulator 16 also acts to maintain the flow of gas into the aspirator 18 at a predetermined rate so as to insure optimum operation thereof.

The device 10 is inflated by actuating the trigger mechanism 10 so as to open the flow path between the pressurized source 12 and the inflatable device. Because it is not feasible to utilize the gas stored in the high-pressure source 12 as the sole means for inflating the device 10, the aspirator 18 is used to increase the volume of inflating gas which is forced into the device 10. As the gas from the source 12 passes through the throat of the aspirator 18, it draws with it a substantial quantity of atmospheric gas. Since it is desirable that the high-pressure container 12 be as highly efficient as possible and because the quantity of gas available from the source 12 is insufficient to fill the device 10 by itself the aspirator must be completely reliable.

In FIG. 2 of the drawing, an aspirating structure in accordance with the present invention is illustrated. This embodiment is comprised of an outer housing member 22 which is cylindrical in shape and includes an upper inlet section 24 having a plurality of atmospheric openings 26 spaced around the periphery thereof. The housing 22 also includes a cylindrical neck portion 28 of a somewhat reduced diameter which forms a shoulder 30 for sealingly engaging the outer surface of the inflatable body 32 when the neck 28 is extended into the filling aperture thereof. The housing 22 is secured to the inflatable body 32 in airtight relationship by a plurality of screws or bolts 34 which are passed through the shoulder 30 and the inflatable body 32 to engage a mounting flange 36.

Disposed within the neck portion 28 is a cylindrical barrel member 38 which sealingly engages the inner surface of the neck portion 28 via O rings 37, or other suitable sealing means, but is axially displaceable therein. With the barrel 38 in its upper position as shown by the dashed lines 39, the rolled edge 46 engages a sealing ring 40 to effectively close the atmospheric inlets 26. In its open position, as illustrated, the barrel 38 cooperates with a jet-supporting member 42 to form a venturi passage through which the atmospheric gases are caused to flow.

The member 42 is generally T-shaped in cross section with the lower leg 44 being variably tapered so as to form a good aerodynamic passage for the gases entering the openings 26. Similarly, the upper portion thereof cooperates with the lip 46 of the barrel 38 to produce a venturi action in the passageway. The member 42 is secured to the outer housing 22 by a plurality of screws 48 positioned around the upper perimeter thereof. Passing through the upper position of the member 42 and extending into the air passage 50 formed by the member 42 and the barrel 38 are a plurality of high-pressure jets 52 which are radially spaced around the axis of the member 42.

A barrel-actuating piston 54 is disposed within a bore 56 extending along the axis of the member 42. The piston 54 includes a head portion 56 which carries an O-ring 60 for sealingly engaging the inner walls of the bore 56. The other end of the piston 54 is rigidly secured to the lower end of the barrel 38 by a suitable spider structure 62.

A spring means 64 is also positioned with the bore 56 around the shaft of the piston 54. The spring 64 engages the lower portion of the piston head 58 to provide an upwardly biasing force thereon which causes the barrel 38 to be normally biased into its upper position sealingly engaging the sealing ring 40 and thus closing the atmospheric air passage into the inflatable body. But when the top of piston 58 is subjected to a high-pressure gas flow which exerts a pressure thereon exceeding that produced by the spring 64, the piston is displaced downwardly drawing with it the barrel 38 and thus opening the atmospheric flow passage 50.

Mounted on the top of the member 42 by a plurality of screws 66 is a lid member 68 having a threaded opening 70 in the center to which a source of high-pressure gases can be connected. Between the lower side of the lid 68 and the upper surface of the member 42, a gas flow chamber 72 is formed which provides a flow path for gases entering through the opening 70 to the jets 52 and the piston chamber 56.

In operation, with no high-pressure gases being provided through the opening 70 in the lid 68, the spring 64 causes the barrel 38 to be biased into its upper position closing the flow passage 50. But when a high-pressure gas is caused to enter the chamber 72, as by actuating the trigger mechanism 14 of the system of FIG. 1, the pressure created within the chamber 72 causes a force to be applied to the head 58 of the piston 54 which is sufficient to drive the piston 58 downwardly against the force of spring 64. As the piston 54 is driven downwardly, it draws with it the barrel 38 causing the flow passage 50 to be opened to the atmosphere.

The high-pressure gases escaping through the jets 52, which are radially spaced around the axis of the device, cause a low-pressure venturi condition to be produced within the passage 50. And as the high-velocity gases pass through the passage 50 they draw with them large quantities of atmospheric air which is forced into the inflatable device through the lower end of the barrel 38. This aspirating action will continue until the pressure in the cylinder 12 decays below a predetermined minimum pressure level, the regulator 16 cannot continue to supply the air chamber 72 with sufficient pressure to maintain the downward position of the piston 54 and the spring 64 causes the piston 54 to be driven upwardly drawing with it the barrel 38 and causing the atmospheric flow passage 50 to be closed as the lip 46 of the barrel 38 engages the sealing ring 40.

Should the bag become completely filled before the source pressure has decayed below this predetermined level the aspirator will merely stall and dump the excessive source gas out of the openings 26 until the source pressure drops to a level which will permit the barrel 38 to return to its upper position to close the openings 26. In either case the remaining portion of the gases introduced into the chamber 72 from the pressurized container 12 are then dumped directly into the bag 32 causing it to be inflated to a pressure slightly exceeding atmospheric pressure. Once the lip 46 seats itself in the seal 40 the force of spring 64 will hold a good seat at that point and no gases will be allowed to escape from the system. And because of the protection afforded the sealing juncture by the housing 22 it is highly unlikely that the seal will be accidentally broken by an inadvertent external blow.

Figure 4:
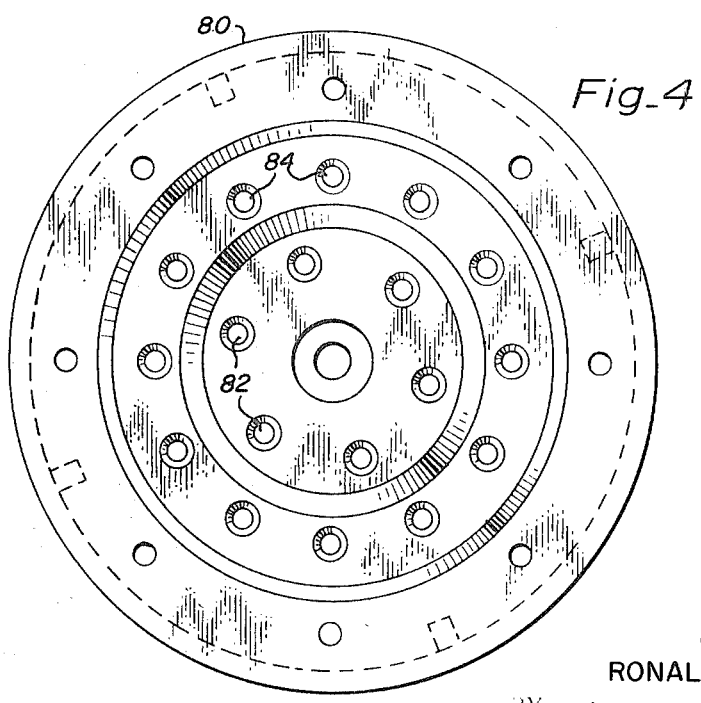
FIG. 4 is a cross section taken along the lines 4-4 of FIG. 3.

In an alternate embodiment, the jet support member 42 may be replaced with a member 80 such as is shown in FIG. 3. The member 80 differs from the member 42 of FIG. 2 in that instead of having a single ring of jets 52 disposed about the axis of the aspirator, this embodiment includes an inner ring of jets 82 and an outer ring of jets 84 which are radially offset with respect to one another, as illustrated in FIG. 4. This embodiment will produce an increased aspiration ratio due to the greater interface action of the jet stream introduced to the venturi chamber 50 and thus causing more atmospheric gas to be introduced to the bag 32 for a given quantity of high-pressure gas.

Whereas in prior art structures the required throat-to-jet area ratio required to build a sufficient back pressure to fill the bag was approximately 60 to 1, the present invention allows the throat-to-jet area ratio to be increased to 120 to 1 or higher and is thus much more efficient.

Other advantages of this particular structure over those of the prior art should be immediately apparent to those of skill in the art. For example, the inlet area for receiving atmospheric gases is substantially larger than that possible using prior art structures thus allowing larger quantities of atmospheric gases to be drawn into the device per unit time. In addition, because of the rotationally symmetric nature of the device this structure enables the use of considerably more high-pressure jets than is possible with the other structures known in the prior art and thus enables a greater speed of aspiration.

Still further it is of material importance that the axes of the high-pressure jet streams substantially coincide with the midpoint of the atmospheric flow stream and the two are exhausted directly into the inflatable device with neither a change in flow direction nor a material flow-disturbing structure downstream of the aspirating area. This feature alone provides a substantial increase in the aspirating efficiency of the apparatus over any known prior art device.

While only one modification of the preferred embodiment described in FIG. 2 has been set for in detail, it is contemplated that after having read the above disclosure certain other modifications will be apparent to those skilled in the art. It is therefore to be understood that the above disclosure is to be taken as merely illustrative of preferred embodiments and not as limiting the invention to the particular features illustrated. Furthermore, it is intended that the appended claims be interpreted as covering all such modifications which fall within the true spirit and scope of the invention.

What I claim is:

1. An aspirator for use in inflating an inflatable device comprising:
   a generally cylindrical housing having a portion mountable external of the inflatable device, said portion having an opening through a side thereof for admitting atmospheric gases into said housing and including gas inlet means for communicating high-pressure gas into said housing;
   flow-diverting means affixed to and disposed concentric with said housing to form the inner wall of an annular flow path for said atmospheric gases entering said opening, said flow-diverting means being generally T-shaped in axial cross section;
   jet means formed in said flow-diverting means for communicatively coupling said inlet means and said flow path for introducing said high-pressure gas into said flow path in a direction generally parallel to the axis of said housing;
   closure means including an open cylinder forming the outer wall of said flow path with one end thereof having an outwardly turned flange, said one end being telescopically received within said housing for sealingly engaging said flow-diverting means to close said annular flow path when axially displaced into engagement therewith, said one end providing a venturi within said flow path when axially displaced from said sealing engagement; and
   pneumatic actuator means disposed within said flow-diverting means in communicating relationship with said inlet means and operative in response to said high-pressure gas to open said closure means.

2. An aspirator as recited in claim 1 and further including resilient means for biasing said closure means into said sealing engagement with said flow-diverting means and for causing said closure means to be returned to said sealing engagement after opening and in response to a predetermined reduction in the pressure of said high-pressure gas.

3. In an inflation system for inflating an inflatable device including a source of compressed gas, means for regulating the flow of compressed gas into said inflatable device and an aspirating means for increasing the quantity of gas forced into said inflatable device beyond that contained within said source of compressed gas, an improved aspirating means comprising:
   a generally cylindrical housing having a portion thereof mounted external of said inflatable device, said portion having a first opening for receiving said compressed gas and at least one other opening in the side thereof for allowing atmospheric air to be drawn into said housing;
   flow-diverting means disposed within said housing and defining the inner wall of a generally annular flow path passing through said housing;
   a plurality of jet means radially disposed about the axis of said housing for communicating streams of compressed gas from said first opening into said flow path in a direction generally parallel to the axis of said housing;
   closure means including an open cylinder telescopically received within said housing and forming the outer wall of said flow path, said cylinder having one end configured for sealingly engaging said flow-diverting means when in a normally closed position; and
   pneumatic actuator means operative to displace said cylinder into an open position in response to the application of compressed gas to said first opening.

4. In an inflation system as recited in claim 3 wherein said housing portion includes a plurality of said other openings spaced around the cylindrical perimeter thereof.

5. In an inflation system as recited in claim 4 and further including resilient means for normally biasing said cylinder into said closed position.

6. In combination,
   a housing having an inlet section and at least one passage in the inlet section for the flow of atmospheric air,
   barrel means movable between first and second positions, the barrel means being disposed in the first position in sealing relationship with the inlet section and being disposed in the second position in displaced relationship to the inlet section to provide for the passage of fluid through the atmospheric opening in the inlet section,
   means for providing a fluid under pressure, control means disposed within the housing and having first and second operative relationships and operative in the first relationship to provide the barrel means in the first relationship for preventing the passage of fluid from the fluid means and operative in the second relationship to provide the barrel means in the second relationship for providing for a passage of fluid from the fluid means,
   support means disposed within the housing for providing for the passage of the fluid from the fluid means through the housing and the barrel means and for the creation of a venturi effect in the passage in the housing to produce a flow of atmospheric air through the passage and the barrel means, and
   means operatively coupled to the control means for triggering the control means from the first operative relationship to the second operative relationship.

7. The combination set forth in claim 6 wherein
   the support means within the housing is tapered to produce a venturi action and wherein jets extend through the support means to pass the fluid from the fluid means into the housing.

8. The combination set forth in claim 6 wherein
   means are disposed within the housing for biasing the barrel means to the first position.

9. In combination,
   a housing having a passage for the introduction of atmospheric air,
   barrel means movable between first and second positions and disposed relative to the housing in the first position to seal the passage and disposed relative to the housing in the second position to open the passage for the introduction of atmospheric air,
   means for providing fluid under pressure,
   trigger means operative to obtain a movement of the barrel means from the first position to the second position,
   means disposed within the housing and responsive to the movement of the barrel means to the second position for providing for a passage of the fluid from the fluid means through the housing and the barrel means in a manner to provide for the passage of atmospheric air through the passage and into the barrel means.

10. The combination set forth in claim 9 wherein
    the last-mentioned means is tapered and is provided with jets to produce a venturi action for drawing atmospheric air through the passage in the housing for mixing with the fluid from the fluid means.

11. The combination set forth in claim 10 wherein
    means are disposed within the housing for biasing the barrel means to the first position and wherein the trigger means are operative to overcome such bias for obtaining a movement of the barrel means to the second position.

12. In combination,
    means for providing fluid under pressure, inflatable means for receiving the fluid from the fluid means,
    a housing having a passage for the introduction of atmospheric air into the housing,
    barrel means movable between first and second positions and disposed relative to the housing in the first position to close the passage and disposed relative to the housing in the second position to open the passage for the introduction of atmospheric air into the housing,
    means disposed within the housing for biasing the barrel means to the first position,
    trigger means operatively coupled to the bias means and actuatable to overcome the bias means and obtain a movement of the barrel means to the second position, and
    means disposed within the housing and responsive to the actuation of the trigger means for introducing jets of fluid into the housing and the barrel means to produce a venturi effect for drawing atmospheric air through the passage and into the barrel means.

13. The combination set forth in claim 12 wherein the jet means includes a member tapered to define a continuous passageway with the barrel means and wherein jets extend through the jet means to pass the fluid under pressure from the fluid means for creating the venturi effect.

14. The combination set forth in claim 12 wherein the passage in the housing is disposed to pass into the atmosphere fluid from the fluid means when the inflatable means becomes inflated to a particular pressure.

15. The combination set forth in claim 14 wherein the barrel means is provided with a rolled edge and the housing is provided with sealing means to facilitate the production of a seal between the barrel means and the housing in the first position of the barrel means.